United States Patent [19]

Schultheiss et al.

[11] 4,180,611

[45] Dec. 25, 1979

[54] SMOOTH-SURFACED NONWOVEN FABRIC

[75] Inventors: Wolfram Schultheiss, Birkenau; Klaus Schmidt, Hirschberg, both of Fed. Rep. of Germany

[73] Assignee: Firma Carl Freudenberg, Hohnerweg, Fed. Rep. of Germany

[21] Appl. No.: 856,564

[22] Filed: Dec. 1, 1977

[30] Foreign Application Priority Data

Dec. 4, 1976 [DE] Fed. Rep. of Germany ....... 2655024

[51] Int. Cl.$^2$ ......................... B32B 5/16; B32B 27/02
[52] U.S. Cl. ............................... 428/288; 210/500 M; 210/507; 427/194; 428/297; 428/332; 428/303; 428/340; 428/402; 428/903
[58] Field of Search .............. 428/281, 283, 297, 288, 428/323, 327, 402, 303, 340, 284, 286, 296, 298, 302, 903; 427/194, 195, 197; 210/490, 491, 507, 500 M, 433 M; 55/512

[56] References Cited

U.S. PATENT DOCUMENTS

| 2,992,149 | 7/1961 | Drelich | 428/281 |
| 3,102,836 | 9/1963 | Griswold | 428/281 |
| 3,503,784 | 3/1970 | Morita | 428/283 |
| 3,762,566 | 10/1973 | Del Pico | 210/490 |
| 3,837,995 | 9/1974 | Floden | 428/298 |

FOREIGN PATENT DOCUMENTS 1159997 of 1969 United Kingdom ..................... 427/195

Primary Examiner—George F. Lesmes
Assistant Examiner—P. Thibodeau
Attorney, Agent, or Firm—Sprung, Felfe, Horn, Lynch & Kramer

[57] ABSTRACT

A nonwoven fabric having a smooth surface, especially for use as support material for semipermeable membranes, comprising a support mat into which at least one surface thereof, an open-structured, continuous covering layer of fine, thermoplastic particles is calendered.

4 Claims, No Drawings

SMOOTH-SURFACED NONWOVEN FABRIC

BACKGROUND OF THE INVENTION

The invention relates to a nonwoven fabric having a smooth surface, especially for use as underlayer material for semipermeable membranes.

It is known that semipermeable membranes, which find application in apparatus operating on the principle of reverse osmosis and ultrafiltration, and are used in the form of tubular and flat membranes, are structurally weak and consequently require a structural support. This support is provided, for example, by perforated tubes or perforated or channeled plates. Since the spacing of the holes or channels in such support materials must be relatively great for the sake of strength on account of the high pressures required in the process, a porous mass which is not compressible in service is used as a drainage stratum between the semipermeable membrane and the support means. Usually, this drainage stratum, which will be referred to hereinafter as the underlayer, is directly coated with the membrane, and serves both for the drainage of the permeate and for the technological support of the delicate membrane.

It is known to use as underlayers nonwoven fabrics which are produced by dry or wet methods or by the spun mat method, and which have been consolidated in some cases by hot calendering. In all nonwovens of this kind, the protrusion of individual fiber ends or loops, however, cannot be prevented entirely. On account of the in the micron-range yet relatively coarse fibers which can be worked by these methods, the surface of the fabric is still relatively rough, even after calendering. On account of this roughness of the underlayer, a membrane of irregular thickness is produced when the underlayer is coated, and this results in irregular membrane properties in the micron range. Due in particular to the protruding fibers, difficulties occur when the membrane is applied in that, during the coating process, the fibers are not laid down and embedded by the membrane solution, but protrude to a greater or lesser extent through the fabric surface and thus extend into the membrane and, in some cases, all the way into and through the surface of the active membrane which is very thin, having a thickness between 500 and 5000 Angstroms. The result of this is a membrane having irregular characteristics and insufficient permeability. Since in the applications in which semipermeable membranes of this kind are used, material flaws must in general be excluded, efforts have been made to increase the thickness of the layer of cellulose acetate, for example, applied by extrusion, far beyond the optimum. This involved not only a reduction in the rate of permeation of the membrane, but also a considerable increase of production costs.

SUMMARY OF THE INVENTION

The invention has as its object the development of a nonwoven fabric having a smooth surface, which is free especially of protruding fiber ends or loops.

This object is achieved by the invention by the fact that the nonwoven fabric is formed of a nonwoven underlayer into whose surface or surfaces an open-structured, continuous covering layer of fine, thermoplastic particles is calendered.

Especially suitable are nonwoven underlayers of chopped and/or unchopped, inorganic and/or organic fibers which are bound together thermally or by a binding agent. In one special embodiment provision is made for the covering layer to consist of particles spun or sprayed directly onto the surface or surfaces of the nonwoven underlayer. The particles forming the covering layer have a diameter of less than about $30 \times 10^{-6}$ m, preferably a diameter between about $1 \times 10^{-6}$ and $20 \times 10^{-6}$ m. In a special embodiment, the particles forming the covering layer are fibers whose cross-section can have other than a round profile. In a special embodiment, the specific weight of the covering layer is of the order of magnitude between about 1 and 200 g/m$^2$, preferably in a range between about 10 and 40 g/m$^2$.

The nonwoven fabric of the invention consists of a nonwoven underlayer which has been formed by a hydrodynamic method, using thermoplastic staple fibers, and has been preconsolidated by a drying process. Then, a covering layer of fine thermoplastic particles is applied to the surface of the underlayer, the method of the electrostatic spraying of plastics from solvents being advantageously applied, as described, for example, in German Auslegeschrift No. 2,032,072. It is also possible, of course, to spin synthetic filaments directly from the melt onto the surface of the nonwoven underlayer, and, if desired, to coat both sides of the nonwoven underlayer. The special advantage of both methods with respect to the invention lies especially in the fact that they assure the achievement of excellent uniformity with regard to the thickness of the covering layers over the entire width of the goods. Layer weights between about 10 and 40 g/m$^2$ can thus easily be achieved.

Another important feature of this method of coating is to be seen in the fact that the plastic particles applied often have a fibrous or ribbon-like structure, the fineness of the fibers or ribbons being less than about $30 \times 10^{-6}$ m in at least one dimension. From this fine particle size an extremely smooth, mat or glossy surface is obtained on the finished product in the subsequent calendering, the nonwoven fabric retaining its porous structure. Even in the micron range, the extremely uniform and smooth structure of the surface of the nonwoven fabric is plainly apparent.

The special advantage of the nonwoven fabric of the invention consists in the fact that it greatly simplifies the application of the membrane solution forming the semipermeable layer by making the optimum formation of a lesser thickness independent of the constantly varying irregularities of the former nonwoven fabrics. In addition to a surprisingly great cost saving and a reduction of the percentage of rejection, and the resultant improvement of the quality of production, the invention makes possible the production of semipermeable membranes of improved permeation rates.

EXAMPLE 1

From a mixture of 35% of undrawn polyester fibers with a titer of 6.8 dtex and a length of 12 mm as well as 65% of drawn polyester fibers with a titer of 1.3 dtex and a length of 12 mm, a watery suspension with a content of solid material of 0.02% is prepared and dehydrated on a screen device similar to a paper machine.

After drying at 150° C., a nonwoven fabric with a weight per unit area of 90 g/m$^2$ is obtained which is reinforced by means of heat calendering.

For this purpose, a combined steel/cotton calendar is used with a roller diameter of each 350 mm. The speed is 5 m/min and the linear pressure is 100 kg/cm and the temperature is 220° C.

Subsequently onto the surface of the thus obtained nonwoven fabric a layer of fine fibers is superimposed by an electrostatic spraying procedure.

As spraying electrodes two charged metal rings which are moved in a cross direction to the transportation direction of the nonwoven fabric, are employed and they are continuously wetted with a solution of 10% of polycarbonate in methylene chloride. The distance of the electrode to the surface of the nonwoven fabric which is led over an oppositely charged electrode is 400 mm. The voltage applied is 150 kV. The speed of the nonwoven fabric is adjusted such that on its surface a fiber layer with an average weight per unit area of 40 g/m$^2$ is deposited. In the micro range, this layer does not have an entirely uniform thickness, but especially the unevenesses of the surface of the carrier nonwoven fabric are equalized and thus a highly plane and uniform surface of the covering layer is formed. After the final calendar treatment with the above described calender with a speed of 12 m/min and a linear pressure of 50 kg/cm and a temperature of 120° C., the surface has a brilliant, extremely uniform appearance. Consequently the surface is free of all irregularities. This is a special advantage as surprisingly the porosity corresponds approximately to that of the uncoated carrier nonwoven fabric. Example 2

On a carding machine a dry nonwoven fabric is formed with a weight per unit area of 100 g/m$^2$ consisting of a mixture of 70% of polypropylene fibers with a titer of 3.3 dtex and a length of 64 mm as well as of 30% of polypropylene fibers with a titer of 2.8 dtex and a length of 60 mm and it is reinforced in the calender of example 1 at a speed of 20 m/min and a linear pressure of 60 kg/cm at a temperature of 145° C. Subsequently the nonwoven fabric is led through an electrostatic fusion spinning device. This device consists on one side of a conveyor band of an open wire network for the nonwoven fabric and on the other side of a part of a constantly rotating, endless metal band which is arranged at a right angle to the transportation direction of the nonwoven fabric. The metal band is brought to an increased temperature by means of secondary devices. Out of the range of the spinning zone, onto its surface particles of polypropylene in powder shape are sprinkled, these particles fuse and form a closed film.

As a result of the movement of the metal band into the spinning zone, particles are extracted from this film under the influence of electrostatic forces according to example 1 and are deposited on the surface of the carrier nonwoven fabric in the form of fine fibers with an average diameter of 0.005 mm. The transportation speed of the nonwoven fabric is adjusted such that on its surface a layer with an average weight per unit area of 35 g/m$^2$ is formed. In this case, too, preferably a filling-up of the cavities and unevenesses in the range of the surface takes place and in this connection a highly uniform and plane surface results.

The thus obtained two-layer materal is then calendered as in example 1 at a speed of 12 m/min and a linear pressure of 40 kg/cm and a temperature of 130° C. The finished two-layer material has a brilliant and completely plane and smooth surface. It is especially suited as a carrier layer for a semi-permeable membrane.

It will be appreciated that the instant specification and examples are set forth by way of illustration and not limitation, and that various modifications and changes may be made without departing from the spirit and scope of the present invention.

What is claimed is:

1. A nonwoven fabric having a smooth surface, especially for use as a support material for a semipermeable membrane, comprising a support mat having at least one surface into which there has been calendered an open structured porous covering layer of fine flat fibers having a thickness of less than about $30 \times 10^{-6}$ m, the covering layer having a specific weight of about 1 to 200 g/m$^2$ and having been formed by electrostatically spinning the fibers directly onto the support mat, the support mat extending over the entire width of the fabric.

2. A fabric according to claim 1, wherein the fiber thickness is from about $1 \times 10^{-6}$ to $20 \times 10^{-6}$ m.

3. A fabric according to claim 1, wherein the covering layer has a specific weight of about 10 to 40 g/m$^2$.

4. In a system for filtration using a semipermeable membrane, the improvement which comprises using said membrane supported on a nonwoven fabric according to claim 1.

* * * * *